(12) United States Patent
Schlaechter

(10) Patent No.: US 8,262,782 B2
(45) Date of Patent: Sep. 11, 2012

(54) RESPIRATOR FILTER CANISTER

(75) Inventor: John Schlaechter, Columbus, OH (US)

(73) Assignee: Avon Protection Systems, Inc., Cadillac, MI (US)

(*) Notice: Subject to any disclaimer, the term of this patent is extended or adjusted under 35 U.S.C. 154(b) by 1325 days.

(21) Appl. No.: 11/939,995

(22) Filed: Nov. 14, 2007

(65) Prior Publication Data
US 2012/0167769 A1 Jul. 5, 2012

Related U.S. Application Data

(62) Division of application No. 10/512,252, filed as application No. PCT/US03/12700 on Apr. 24, 2003, now Pat. No. 7,331,364.

(60) Provisional application No. 60/319,206, filed on Apr. 25, 2002.

(51) Int. Cl.
*A62B 23/02* (2006.01)
*B01D 53/02* (2006.01)

(52) U.S. Cl. ......... 96/108; 55/DIG. 33; 96/135; 96/147; 128/201.25

(58) Field of Classification Search ............. 55/DIG. 33, 55/DIG. 35; 96/108, 134, 135, 147; 128/201.25; 141/12, 74, 80
See application file for complete search history.

(56) References Cited

U.S. PATENT DOCUMENTS

| 3,306,323 | A | 2/1967 | Aronson |
| 4,543,112 | A | 9/1985 | Ackley et al. |
| 4,611,589 | A | 9/1986 | Pasternack |
| 5,078,132 | A | 1/1992 | Braun et al. |
| 5,660,173 | A | 8/1997 | Newton |
| 5,669,375 | A | 9/1997 | Dahrendorf et al. |
| 5,714,126 | A | 2/1998 | Frund |
| 6,065,509 | A | 5/2000 | Bonney et al. |
| 6,214,094 | B1 | 4/2001 | Rousseau et al. |
| 6,382,206 | B1 * | 5/2002 | Palazzotto et al. ....... 128/201.19 |
| 6,497,756 | B1 | 12/2002 | Curado et al. |
| 6,698,465 | B2 | 3/2004 | Tanaka et al. |
| 7,234,462 | B2 * | 6/2007 | Palazzotto et al. ....... 128/201.19 |

FOREIGN PATENT DOCUMENTS

| DE | 946334 | 7/1956 |
| EP | 0339487 | 11/1989 |
| GB | 470850 | 8/1937 |
| WO | 9729048 A1 | 8/1997 |
| WO | 0178839 A2 | 10/2001 |

* cited by examiner

*Primary Examiner* — Duane Smith
*Assistant Examiner* — Sonji Turner
(74) *Attorney, Agent, or Firm* — McGarry Bair PC

(57) ABSTRACT

A gas mask filter canister of varying shapes is filled by orienting the a fill opening to face upwardly, introducing into the fill opening a particulate filter material, and vibrating the filter canister at a frequency and amplitude, and for a time until a predetermined packing density is reached. The invention can be used to fill elliptical or other odd shaped filter canisters having a concave profiles to conform closely to the curvature of the wearer's face.

9 Claims, 5 Drawing Sheets

RESPIRATOR FILTER CANISTER

CROSS-REFERENCE TO RELATED APPLICATION

This application is a divisional of U.S. patent application Ser. No. 10/512,252, filed Oct. 20, 2004, now U.S. Pat. No. 7,331,364, issued Feb. 19, 2008, which claims priority of International Application No. PCT/US03/12700, filed Apr. 24, 2003, which claims the benefit of U.S. Provisional Patent Application 60/319,206, filed Apr. 25, 2002.

BACKGROUND OF THE INVENTION

1. Field of the Invention

The invention relates to filter canister for gas masks. In one aspect, the invention relates to a filter cartridge having a concave profile conforming to the curvature of the wearer's face. In yet another of its aspects, the invention relates to a filter canister for a gas mask wherein the canister has an oblong shape and a concave profile for conforming to the shape of a user's face. In another of its aspects, the invention relates to a filter cartridge having a concave conformal outlet wall and a conformal particulate filter.

2. Description of the Related Art

PCT Application No. US01/12545, published Oct. 25, 2001, discloses a bayonet-type connector for connecting a removable filter to a gas mask. A filter canister having an oval shape is also disclosed, comprising parallel planar inlet and outlet faces separated by a perimeter wall.

Conventional replaceable circular or elliptical gas mask filters with parallel planar inlet and outlet faces can be mounted to both sides of the mask to extend laterally outwardly of the mask. Such filters typically comprise a folded paper or fabric particulate filter and a granulated carbon adsorption filter. Settling of adsorbent in gas mask filters before or during use can result in localized areas in which the gas flow path through the adsorbent is shorter than through the bulk of the adsorbent. This results in increased air flow through a smaller volume of adsorbent with a consequent early breakthrough of contaminant material. In order to maximize the density of the carbon granules and avoid settling and the introduction of uncontrolled flow channels through the adsorption filter, the adsorbent (i.e. granulated carbon) is typically placed in the filter canister through a process of "raining" or "snow storm" filling the granules into the filter in such a way that the density of the adsorbent is maximized. In this method, the adsorbent drops through a tube containing four to five metal wire screens with the same face area as the container to be filled. The screen opening size and spacing is related to the particle size of the adsorbent being filled. No single particle has the opportunity to pass through the tube without hitting the screen wires. This effectively randomizes and uniformly distributes the particles across the surface of the container being filled. The adsorbent is also structurally constrained with a compressive force. The "snow storm filling" process requires that the inlet and outlet faces be planar in order to form a uniform particle depth of filter material.

Filters having a concave profile to conform closely to the curvature of the wearer's face offer several advantages over conventional filters having planar inlet and outlet faces. However, the curvature of the filter is not conducive to the conventional "snow storm filling" method of placing the adsorbent in the filter canister, and can prevent the adsorbent from assuming a minimum required density and uniform depth. The "snow storm filling" method is only applicable to an adsorbent bed which has a uniform flat depth. The "snow storm filling" method is not effective for a conformal filter design having a carbon filter bed that has an arcuate contour on the inlet and outlet faces with a constant bed depth between them. In order to ensure a minimum required thickness of the adsorbent at a minimum required density, a greater thickness of adsorbent may be needed as compared to a filter having planar inlet and outlet faces, increasing the cost of the filter.

SUMMARY OF THE INVENTION

According to the invention, a filter canister housing is formed by an inlet wall and a concave outlet wall that are spaced from each other and joined by a curved peripheral outer wall, the inlet and outlet walls have openings therein for passage of air therethrough, a particulate filter material in the housing and forming a conformal filter element within the housing to filter air passing from the inlet wall to the outlet wall, wherein the housing with the particulate filter material therein has been vibrated at a frequency and amplitude, and for a time until a desired packing density is reached. The filter material is thus formed into a filter bed of uniform depth with a convex inlet surface and a concave outlet surface to substantially conform to the shape of the canister.

The filter canister can take a number of shapes but in a preferred embodiment, it has a curved peripheral outer wall and the fill opening is in the peripheral outer wall. The filter canister can be elliptically shaped or some other complex or irregular shape. In one embodiment, the inlet wall is convex. Preferably, the shape of the filter bed is defined at least in part by the canister walls and further conforms to the shape of the inlet and outlet walls.

The desired packing density of the particulate filter material is at least 0.6 grams per cubic centimeter, preferably in the range of about 0.60 to about 0.72 grams per cubic centimeter. The particulate filter material is selected from the group of activated charcoals, zeolites, molecular sieves and alumina, preferably, ASZM-TEDA carbon.

In a preferred embodiment, the filter cartridge has an oblong or oval shape, and the particulate filter materials are 20×50 ASZM-TEDA carbon granules, the frequency of the vibration is about 60 Hz in a vertical direction and about 29 Hz in a horizontal direction.

DESCRIPTION OF THE PREFERRED EMBODIMENT

Figure 1:
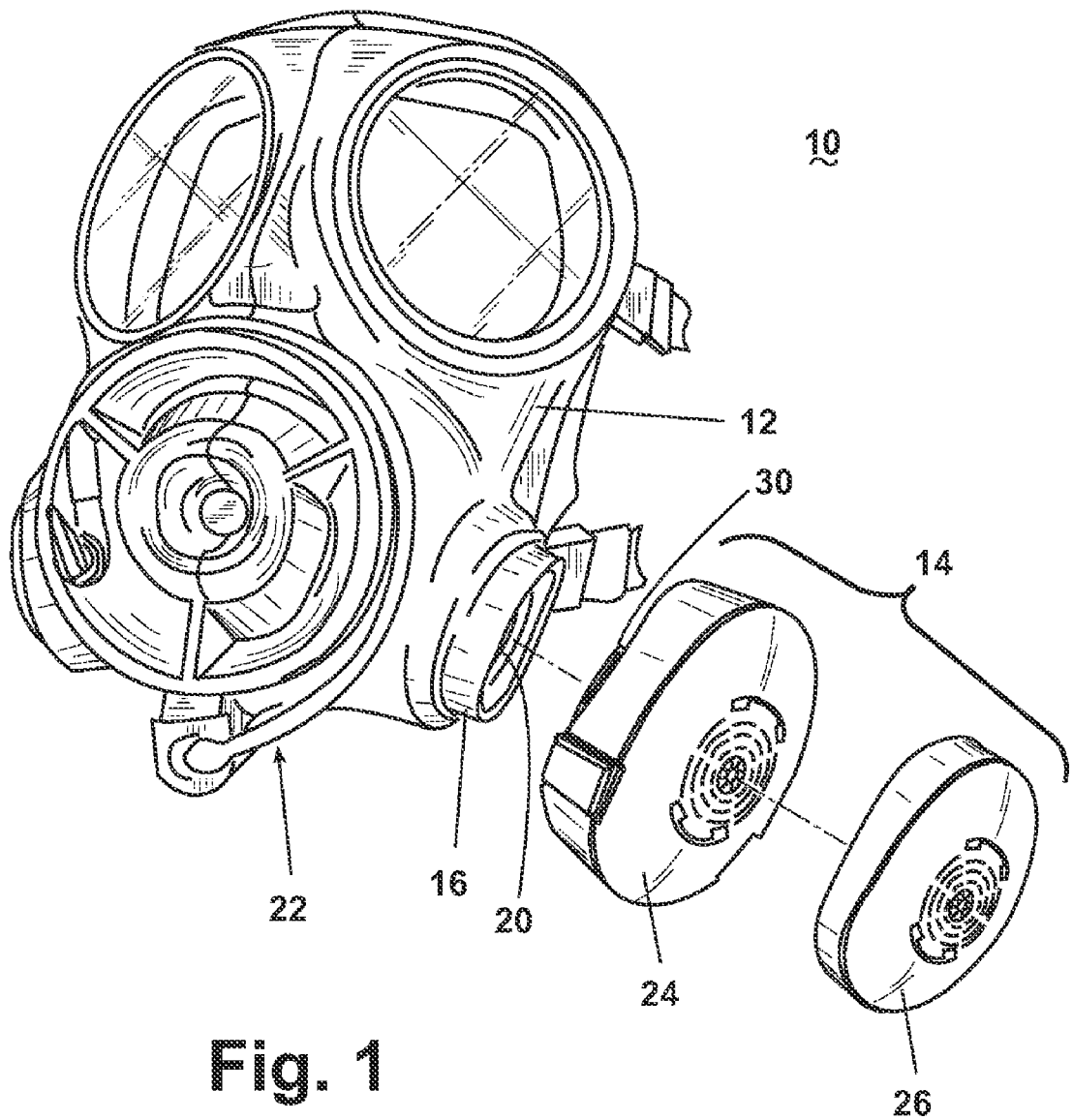
FIG. 1 is an exploded perspective view of a gas mask with a filter assembly comprising a primary filter and an auxiliary filter according to the invention.

A gas mask assembly 10 comprising elliptically-shaped conformal filters is shown in FIG. 1. The gas mask assembly 10 comprises a generally conventional gas mask 12 and at least one laterally-extending filter assembly 14. The gas mask 12 comprises at least one filter mount 16 at a lower lateral portion of the gas mask 12, comprising a self-sealing mechanism as disclosed in PCT application US01/12545, published Oct. 25, 2001, and incorporated herein by reference in its entirety, and an inlet port 20. A single filter assembly 14 is shown in FIG. 1 attached to a single filter mount 16 on a first side of the gas mask 10. Alternatively, the filter assembly 14 can be mounted to a second side of the gas mask 10, or a pair of filter assemblies can be utilized. In the preferred embodiment, the inlet port 20 can receive a bayonet connection on the filter assembly 14 as disclosed in PCT Application No. US01/12545, although a threaded filter connector 30 can also be utilized, as shown on the filter assembly 14 in FIGS. 1 and 2. The gas mask 12 can also comprise a speech module 22 that combines the functions of speech and drinking. Such a speech module is disclosed in U.S. Provisional Patent Application Ser. No. 60/306,333, filed Jul. 18, 2001.

The filter assembly 14 comprises a primary filter 24 and an auxiliary filter 26 adapted in a conventional manner for fluid interconnection and mounting to the gas mask filter mount 16.

Figure 2:
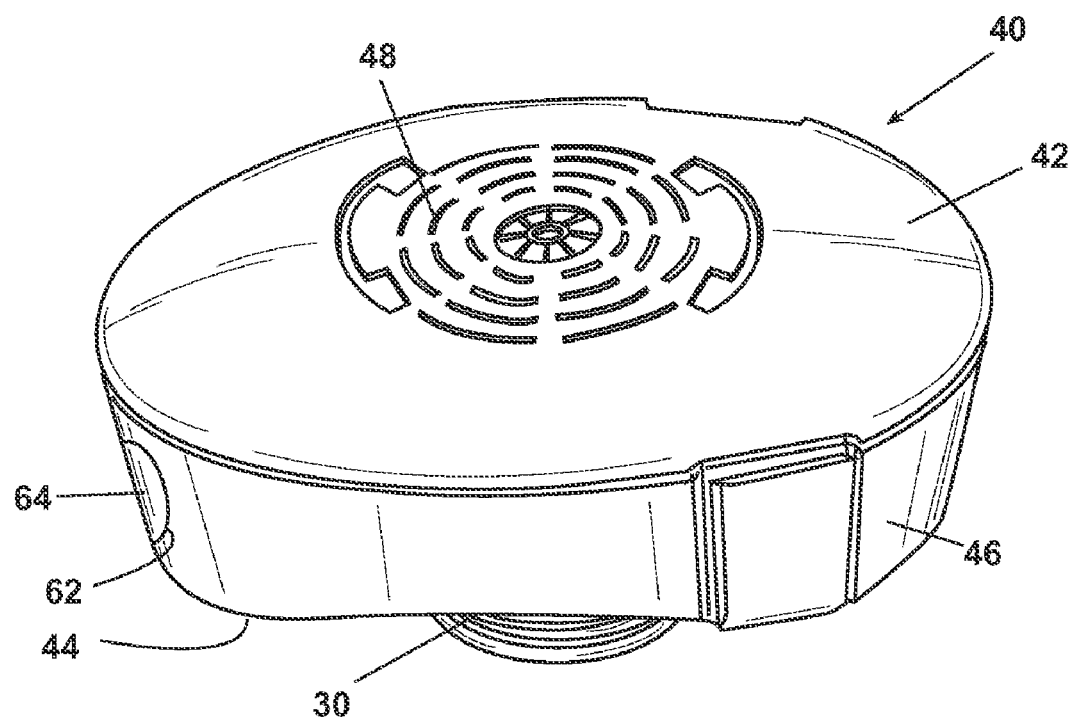
FIG. 2 is a perspective view of the primary filter of FIG. 1.

Referring now to FIG. 2, the primary filter 24 comprises a gas mask filter having a generally conventional design except for an elliptically-shaped canister 40 with a generally concave or arcuate outlet wall for conforming the canister 40 to the curvature of the wearer's face. The canister 40 has a convex inlet wall 42 and a concave outlet wall 44 in parallel, spaced-apart relationship joined by a peripheral outside wall 46 to define an enclosed filter chamber (not shown) in which filter elements are retained. The outlet wall has a fill opening 62 at one end with a plug 64 sealed in the opening. At least one generally conventional particulate filter element (not shown) and at least one generally conventional adsorption filter element (not shown) are retained within the filter chamber. The airflow through the filter 40 can be axial or radial, passing into the canister 40 through inlet openings 48 in the inlet wall 42, through the particulate filter element and the adsorption filter element, and exiting the canister 40 through an aperture in the outlet wall 44 to enter the gas mask 12 through the inlet port 20. The primary filter 24 can have the general structure and arrangement of the particulate filter element and the adsorption filter element as shown in PCT Application No. US01/12545, or other suitable filter element structures and arrangements accommodating radial or axial flow through the filter 24.

The adsorption filter element comprises a granulated activated charcoal which can be impregnated with heavy metal salts such as copper, silver, zinc and molybdenum, and also with amine triethylenediamine, to provide protection against airborne military chemical materials. Other conventional impregnated charcoals or alumina suitable for military applications can be used, as can non-impregnated charcoals for filters to be used in industrial rather than military applications. As an example, a copper sulfate-treated charcoal can be used for an environment containing ammonia.

The granulated charcoal that forms the adsorbent filter element is filled in the filter chamber by a process of controlled vibration filling in order to achieve a minimum required density.

Figure 3:
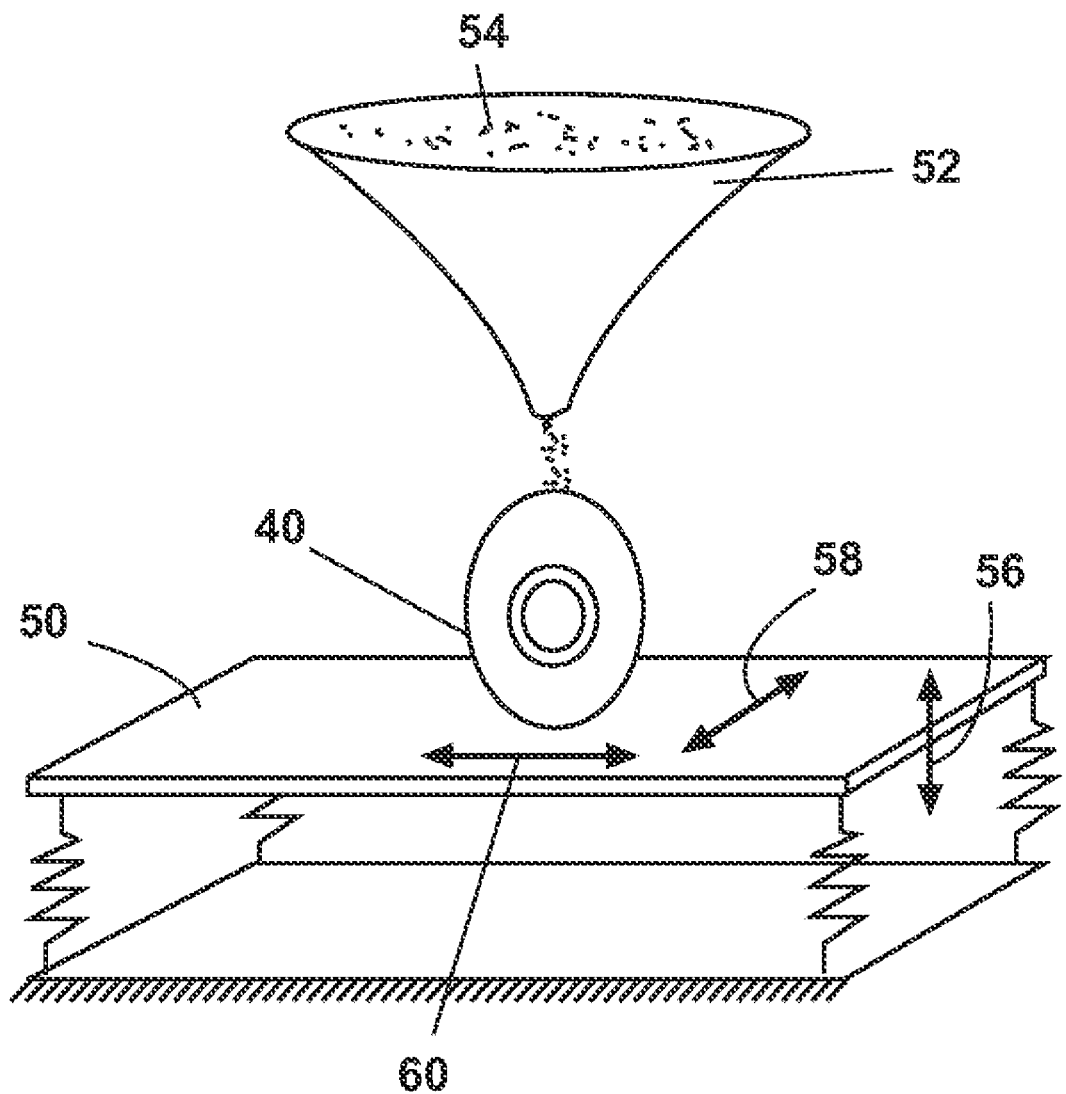
FIG. 3 is a schematic view of a vibrating table used in the filling of the primary filter of FIG. 2 with a granulated carbon adsorbent according to the invention.

The process for placing the granulated charcoal into the filter will now be described with reference to FIG. 3. A suitably-sized orifice 62 is provided in the outside wall 46 through which the charcoal granules 54 are introduced from a hopper 52 while the canister 40 is operably supported on a vibrating platform 50. FIG. 3 shows the filter canister 40 in a schematic representation supported on a vibrating platform 50 for imparting vertical and horizontal vibration to the canister 40 as the canister 40 is filled with a granular adsorbent. However, any suitable device can be utilized for imparting vertical and horizontal vibration to the canister 40 during filling, consistent with the vibration parameters hereinafter discussed.

The vibrating platform 50 can impart a variable-frequency, variable-amplitude vertical vibration 56 to the canister 40. The vibrating platform 50 can also impart a variable-frequency, variable-amplitude first horizontal vibration 58 and a variable-frequency, variable-amplitude second horizontal vibration 60 orthogonal thereto to the canister 40. The magnitudes of both horizontal and vertical forces are carefully controlled in order to impart sufficient energy into the charcoal granules to enable them to achieve an optimum packing density of approximately 0.62 grams per cubic centimeter for ASZM-TEDA carbon. The optimum packing density will vary with the particle density of each type of carbon. When filling is complete, a plug 64 is placed into the orifice and ultrasonically welded to the outer side wall 46 to complete the enclosure of the granular adsorbent filter element. The vertical and horizontal vibrations 56-60 can be independently varied to optimize the density of the granular adsorbent during the filling process.

Vibration Theory

The vibration parameters of frequency, amplitude, time, and direction in order to achieve an optimum density of a particulate material are based upon well-known theory. If the filter is vibrated vertically and sinusoidally during filling, then the adsorbent particles will experience varying effective weights as a function of time, vibration amplitude and vibration frequency. The equations of motion are developed starting with the following definitions:

A: Maximum half-cycle travel, in feet (amplitude)
a: Instantaneous filter acceleration at any time, in feet/second$^2$
f: Frequency, in cycles/second
g: Acceleration of gravity=32.174 feet/second$^2$
n: Any integer from 0 to ∞
t: Time, in seconds
v: Instantaneous filter velocity at any time, in feet/second
z: Instantaneous filter vertical position at any time, in feet
The relevant equations are:

$$z = A \cdot \sin(2 \cdot \pi \cdot f \cdot t) \qquad 1.$$

$$2. \quad v = \frac{dz}{dt} = A \cdot 2 \cdot \pi \cdot f \cdot \cos(2 \cdot \pi \cdot f \cdot t)$$

$$3. \quad a = \frac{dv}{dt} = -A \cdot (2 \cdot \pi \cdot f)^2 \cdot \sin(2 \cdot \pi \cdot f \cdot t)$$

$$4. \quad \frac{da}{dt} = -A \cdot (2 \cdot \pi \cdot f)^3 \cdot \cos(2 \cdot \pi \cdot f \cdot t) = 0$$

$$0 = \cos(2 \cdot \pi \cdot f \cdot t) \qquad 5.$$

and, therefore, $$2 \cdot \pi \cdot f \cdot t = 0.5\pi + n\pi \qquad 5a.$$

$$a = g = 32.174 \text{ ft/s}^2 = -A \cdot (2 \cdot \pi f)^2 \cdot \sin(0.5\pi + n\pi) \qquad 6.$$

$$32.174 \text{ ft/s}^2 = -A \cdot (2 \cdot \pi \cdot f)^2 \qquad 7.$$

Figure 4:
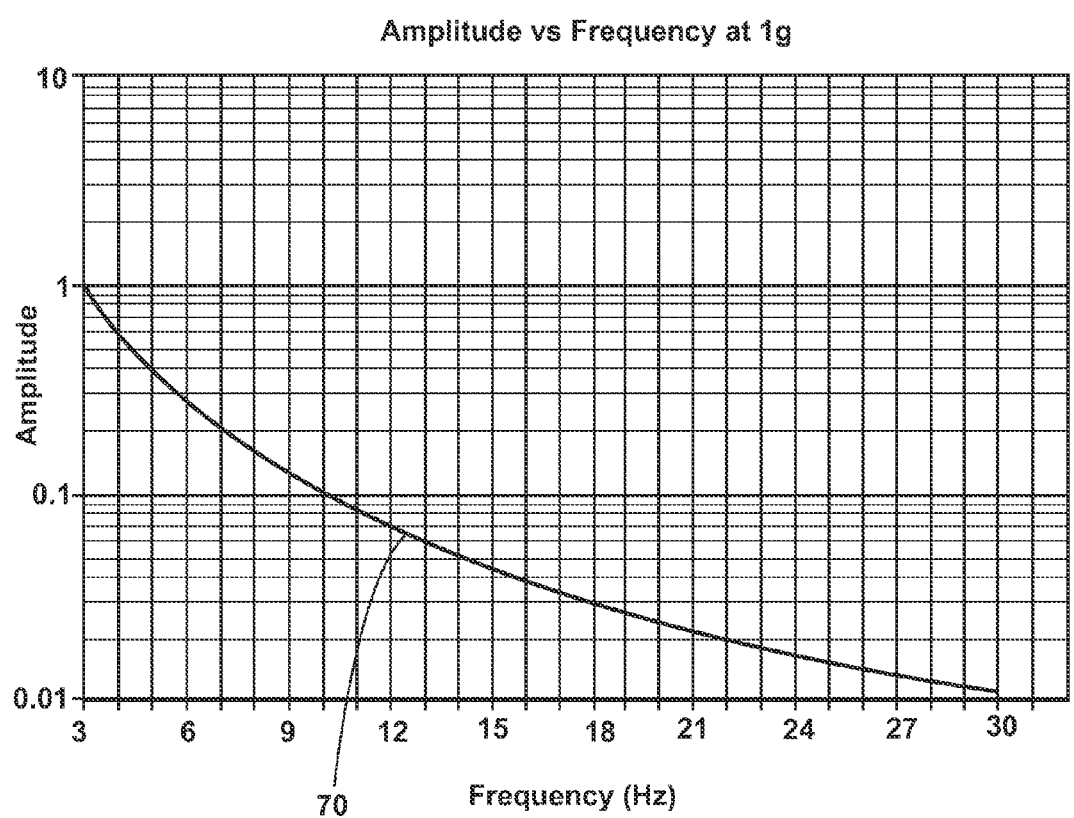
FIG. 4 is a graphical representation of a relationship between vibration frequency and amplitude when a filter canister is subjected to a vibrational acceleration of 1 g.

Equation 1 defines the vertical position of a vibrating filter as a function of time and of the vibration frequency and amplitude. Equation 2 reflects the fact that filter velocity is the derivative of position with respect to time. Equation 3 defines filter acceleration as the derivative of the velocity with respect to time. Equation 4 is used to determine when the filter vertical acceleration is at a minimum or maximum value. This will occur whenever the derivative of acceleration with respect to time, equation 5, is zero. For the trivial case when either frequency or time is zero, the maximum and minimum acceleration is also zero. For all other cases, the minimum and maximum accelerations occur when the cosine function is zero, as shown in equation 5. This occurs every half cycle (180°) starting at 0.571 radians (90°). The magnitude of the acceleration is the same for the minimum and maximum, but the directions are opposite, i.e. positive or upward for the maximum and negative or downward for the minimum. The adsorbent experiences the greatest effective reduction in weight when the filter is accelerating at its maximum downward value. This is the condition at which it is desirable to apply the maximum lateral force to the filter in order to move the adsorbent particles into their most stable position. This condition occurs every time n is an even integer and the sine function in equations 1, 3 and 6 equals +1. Empirical data indicates that tightest packing is achieved at less than fluidization flow, thus optimum maximum vertical acceleration will be less than 1 g. Equation 7 defines the upper limit on vertical acceleration at 1 g. Corresponding values of amplitude and frequency are shown in FIG. 4.

For optimum packing of adsorbent, the filters must be vibrated vertically at some frequency and amplitude combination below the curved line 70 shown in FIG. 4. Empirical data does not yet exist from which to determine the optimum lateral vibration to move the individual particles into their optimum locations, but can be experimentally determined. It is anticipated that the maximum lateral acceleration would be 1 g or less and that the optimum amplitude would be approximately equal to the particle diameter. Optimal acceleration for filling will typically be less than 1 g. The maximum positive and negative lateral accelerations should occur at the same time as the maximum downward vertical acceleration. Thus, the lateral vibration frequency must be in phase with the vertical frequency and exactly half its value. The preferred embodiment of the lateral vibrators comprises two lateral vibrators positioned 90° apart. These vibrators should be actuated alternately, since simultaneous operation would result in motion in a single direction as determined by vector addition of their operation. Alternately, one lateral vibrator can be used while continuously rotating the filter during filling. In yet another embodiment, a rotating horizontal vibrator can be used.

A rotating horizontal vibrator has the advantage that a particle may be moved in any horizontal direction as long as the horizontal and vertical frequencies are not the same. The maximum downward acceleration will occur at a different horizontal direction for each cycle when the frequencies are not identical.

The object of the vibrational filling technique is to provide sufficient energy to move particles from less dense positions to more dense positions without removing particles from the more dense positions. Particle shape is one factor in minimizing the tendency of a particle to move out of a dense configuration during vibration. With the volume of the voids between the particles minimized, resulting in a greater packing density, the particle will be more difficult to dislodge. These properties will improve the more closely the shape of the particle matches the shape of the depression into which it falls.

Vibrational filling is sensitive to fill rate. Each subsequent layer of particles restricts the movement of the particles below and "locks" them into place. The fill rate must allow each layer of particles sufficient time to settle into place. This has particular ramifications for a conformal filter, because the cross-sectional area being filled increases from zero to a constant value at the beginning of the filling process and then decreases to a small value at the end of the filling process.

Empirical Development

Experimental testing was conducted to evaluate the feasibility of vibrational adsorbent packing and to indicate approaches for optimization of the method.

A baseline was established by "snow storm" filling a 1,000 ml graduated cylinder with 510.56 grams of 20×50 ASZM-TEDA carbon.

A dual axis vibration table was utilized having a usable test surface of 3"×6". Vibration force was independently adjustable in the vertical and horizontal directions. However, horizontal vibration greater than 1 g force generated vertical vibrations in the test surface that interfered with some of the tests. A single waveform generator supplied the base vibration signal so that vertical and horizontal vibrations were identical in frequency, phase and sinusoidal waveform. Seventeen tests were completed using a standard graduated cylinder. The best vibrational packing density achieved was identical to the best "snow storm" filling results. This condition occurred at a vibrational frequency of 24.7 Hz, vertical acceleration of 0.35 g and a horizontal acceleration of 1.0 g.

Subsequent testing was done utilizing various versions of vibration tables specifically designed to allow independent control of vertical and horizontal frequencies and amplitudes. The horizontal vibration was forced by a variable speed motor with a weight positioned a fixed distance from the motor shaft. The motor was attached vertically to the horizontal vibrating plate of the vibration table so that the weight rotated in the horizontal plane. The vertical position of the weight was adjusted to minimize the vertical component of the horizontal vibration, but this vertical component remained significant. The resulting horizontal acceleration comprised a rotating vector which traversed 360° of rotation every cycle. This mode of vibration can be expected to provide better results than a one or two-direction horizontal acceleration, as previously discussed.

Vertical acceleration of the horizontal plate was provided by an electromagnet mounted under the center of the plate. This arrangement created a small, unwanted horizontal vibration component.

Figure 5:
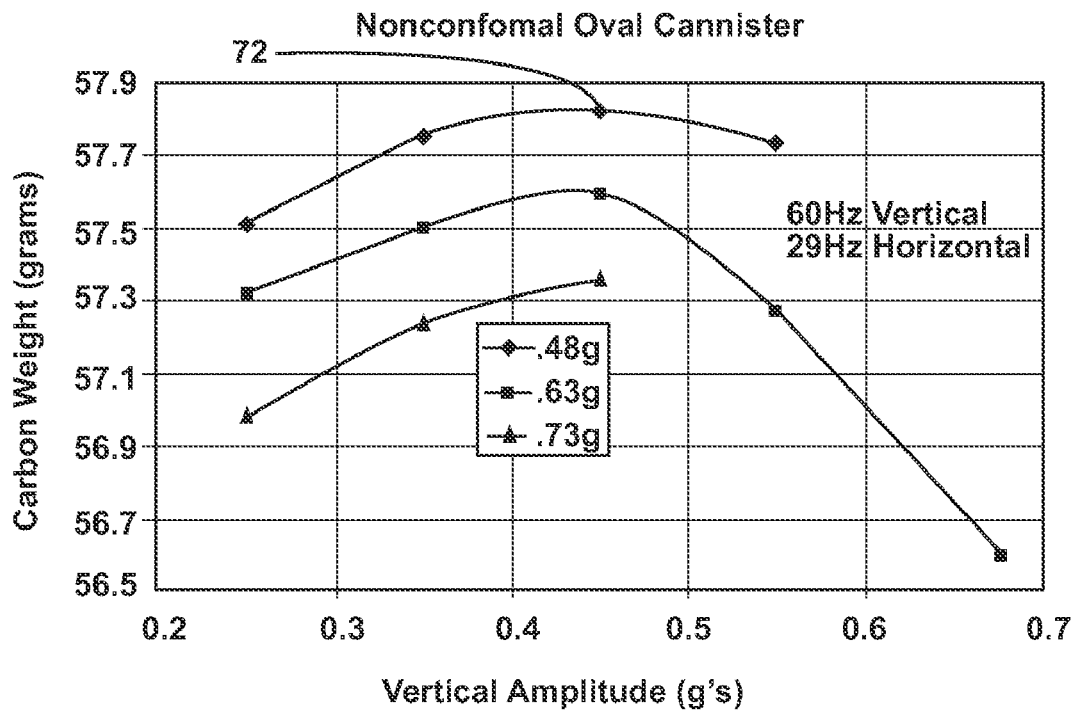
FIG. 5 is a graphical representation of an optimal weight of granulated carbon adsorbent for selected vertical and horizontal vibration amplitudes at a fixed horizontal and a first vertical frequency.

FIG. 5 shows the results of testing using a non-conformal (flat), oval shaped filter using 20×50 ASZM-TEDA carbon granules, with a 60 Hz vertical vibration, a 29 Hz horizontal vibration, and variable vertical and horizontal acceleration. Maximum carbon granule density 72 was achieved for these conditions at a horizontal acceleration of 0.48 g and vertical acceleration of 0.45 g.

Figure 6:
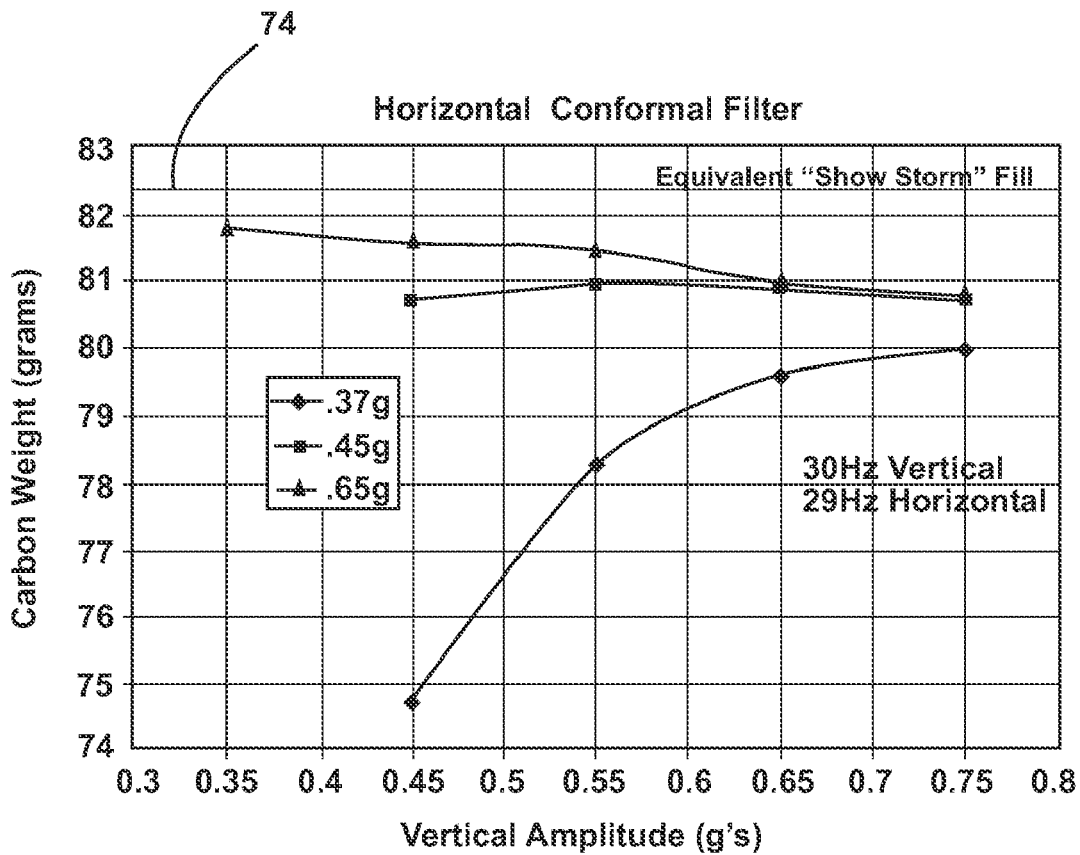
FIG. 6 is a graphical representation of an optimal weight of granulated carbon adsorbent for selected vertical and horizontal vibration amplitudes at a second vertical frequency.

FIG. 6 shows the results for vibrationally filling a conformal filter when the horizontal and vertical frequencies are almost identical, i.e. a 30 Hz vertical vibration and a 29 hertz horizontal vibration. As shown in FIG. 6, vertical and horizontal acceleration were also varied. The test results indicate that the packing density is less than that of "snow storm" filling, represented by line 74, is optimized by utilizing a higher horizontal amplitude, and is less dependent on vertical amplitude at the higher horizontal amplitude.

The vibrational filling method for an elliptical, conformal, granulated carbon adsorption filter disclosed herein solves the problems of inadequate and inconsistent adsorbent density, and settling of the adsorbent material during use of the filter, experienced with an elliptical, conformal, granulated carbon filter prepared using a conventional "snow storm filling" method. This enables elliptical, conformal gas mask filters to be economically fabricated, thereby improving the functionality of a conventional gas mask by conforming the primary filter 24 to the curvature of the wearer's face, and streamlining the profile of the gas mask 12 and filter assembly 14. The streamlined profile reduces the potential that the filters 24, 26 will interfere with the wearer's vision and activities (e.g. sighting a firearm), or contact objects in close proximity to the wearer, potentially damaging the filter assembly 14 and rendering it inoperative, and injuring the wearer. The improved method of manufacturing adsorption filter elements provides the desired filtering capability of a granulated activated charcoal filter in an elliptical, conformal filter.

While the invention has been specifically described in connection with certain specific embodiments thereof, it is to be understood that this is by way of illustration and not of limitation. Reasonable variation and modification are possible within the scope of the foregoing drawings and description without departing from the spirit of the invention.

What is claimed is:

1. A filter canister comprising:
   a housing formed by an inlet wall and a concave outlet wall that are spaced from each other and joined by a curved peripheral outer wall, the inlet and outlet walls having openings there for passage of air therethrough;
   a particulate filter material in the housing and forming a conformal filter element within the housing to filter air passing from the inlet wall to the outlet wall;
   wherein the housing with the particulate filter material therein has been vibrated at a frequency and amplitude, and for a time until a desired packing density is reached.

2. A filter canister according to claim 1 wherein the outer peripheral wall is a complex shape.

3. A filter canister according to claim 2 wherein the outer peripheral wall is oblong shaped.

4. A filter canister according to claim 1 wherein the filter material is formed into a filter bed of uniform depth.

5. A filter canister according to claim 1 wherein the inlet wall is convex.

6. A filter canister according to claim 1 wherein the particulate filter material has a packing density in the range of about 0.62 to 0.72 grams per cubic centimeter.

7. A filter canister according to claim 1 wherein the particulate filter material is selected from the group of activated charcoals, zeolites, molecular sieves and alumina.

8. A filter canister according to claim 7 wherein the particulate filter material is ASZM-TEDA carbon.

9. A filter canister according to claim 1 wherein the curved peripheral outer wall has a fill opening that is closed by a plug.

* * * * *

UNITED STATES PATENT AND TRADEMARK OFFICE
CERTIFICATE OF CORRECTION

PATENT NO.        : 8,262,782 B2                             Page 1 of 1
APPLICATION NO.   : 11/939995
DATED             : September 11, 2012
INVENTOR(S)       : John Schlacchter It is certified that error appears in the above-identified patent and that said Letters Patent is hereby corrected as shown below:

In the Specification

Column 1, after line 11 insert:

--GOVERNMENT INTEREST

This invention was made with government support under DAAD13-00-C-0021 by the Department of Defense (US Special Operations Command). The government has certain rights in this invention.--

Signed and Sealed this
Second Day of June, 2015

Michelle K. Lee
*Director of the United States Patent and Trademark Office*